No. 884,061. PATENTED APR. 7, 1908.
E. P. ARMSTRONG.
DEVICE FOR SHAPING SWAGED SAW TEETH.
APPLICATION FILED APR. 2, 1906.
2 SHEETS—SHEET 1.
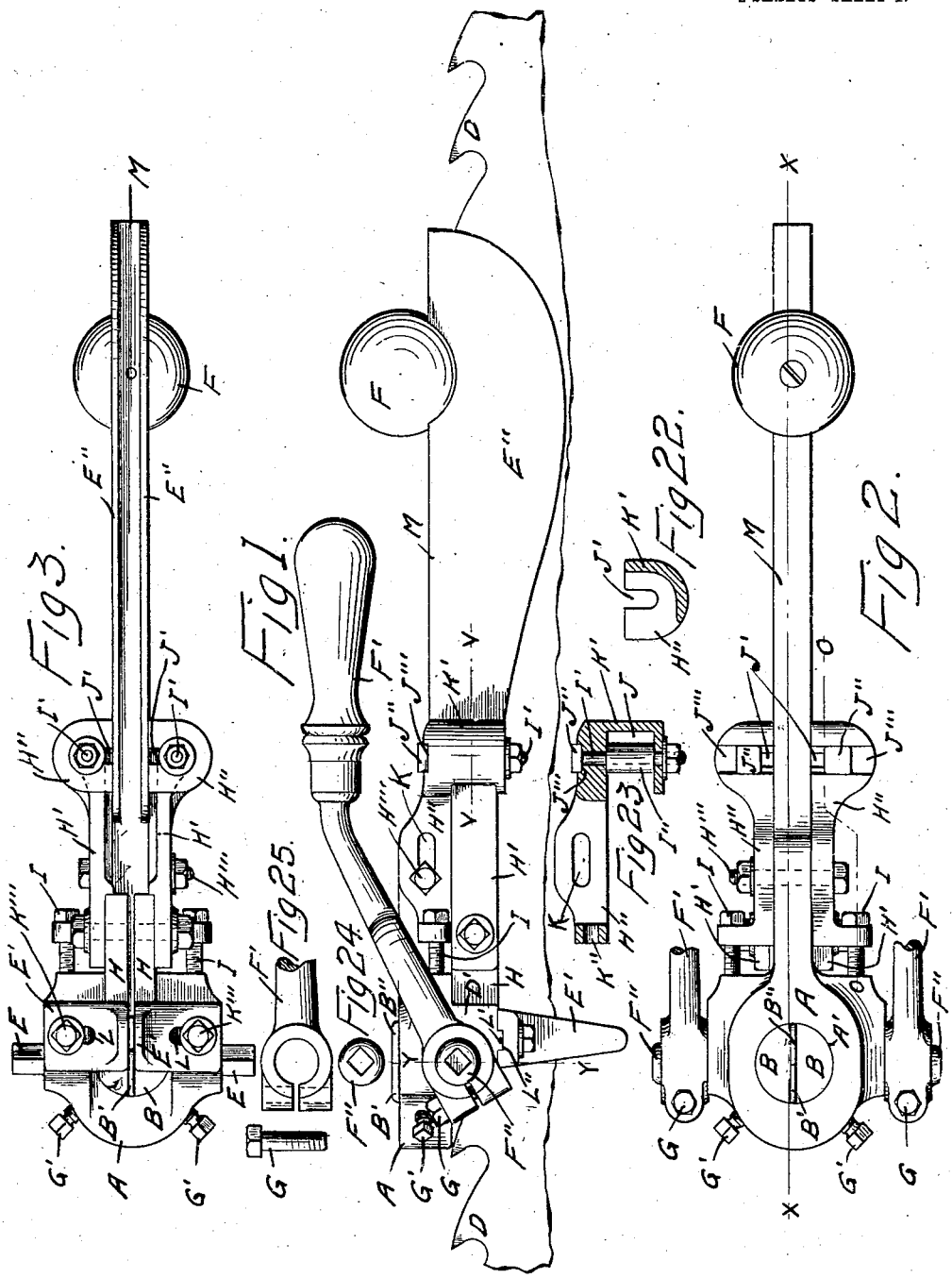
WITNESSES
INVENTOR
EDWARD P. ARMSTRONG
HIS ATTORNEYS

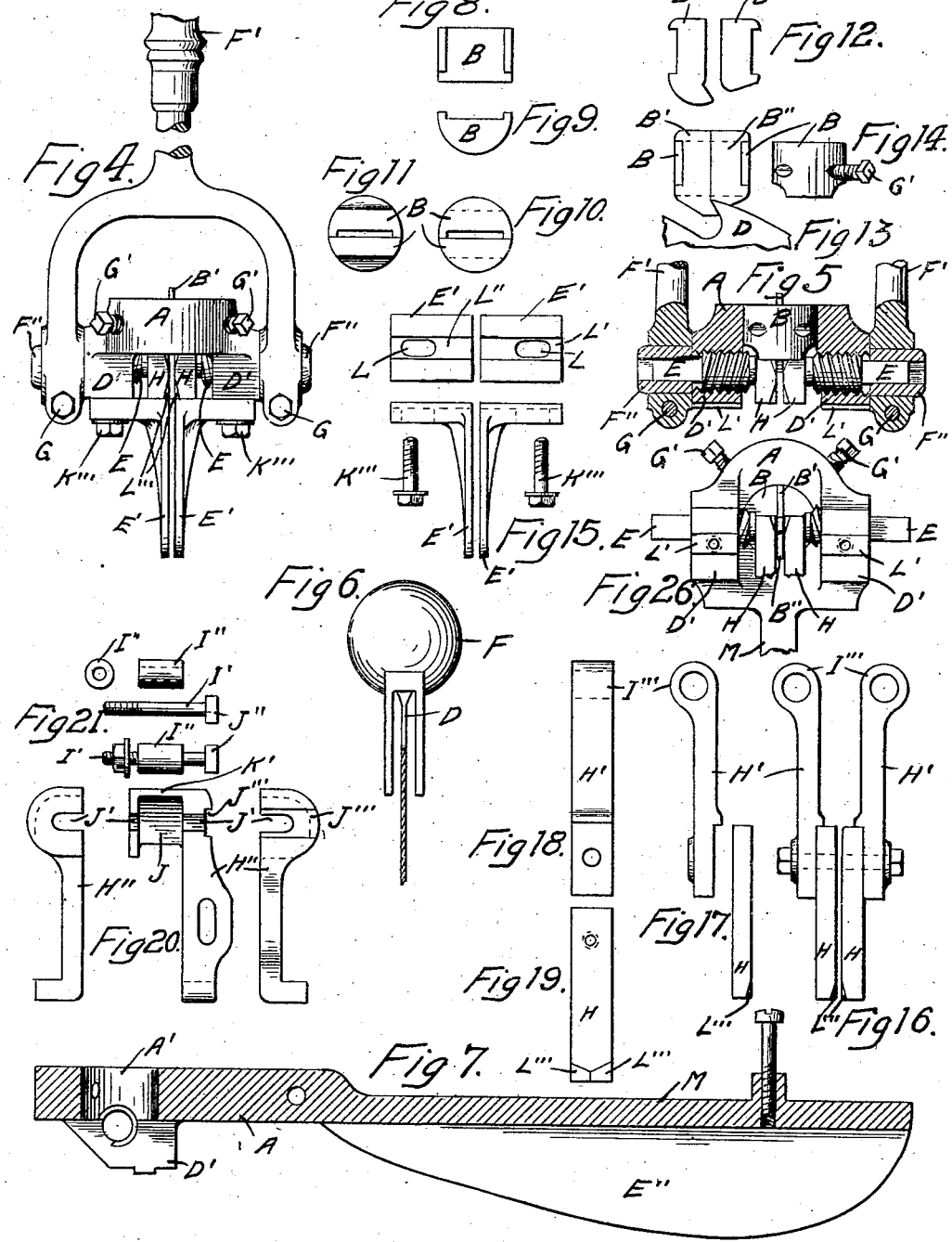

UNITED STATES PATENT OFFICE.

EDWARD PICKERING ARMSTRONG, OF PORTLAND, OREGON.

DEVICE FOR SHAPING SWAGED SAW-TEETH.

No. 884,061.     Specification of Letters Patent.     Patented April 7, 1908.

Application filed April 2, 1906. Serial No. 309,570.

*To all whom it may concern:*

Be it known that I, EDWARD PICKERING ARMSTRONG, a citizen of the United States, residing at Portland, in the county of Multnomah and State of Oregon, have invented a new and Improved Device for Shaping Swaged Saw-Teeth, of which the following is a full, clear, and exact description.

The object of my invention is to provide a device for shaping the swaged teeth, of band, gang and circular saws, which is adapted to more fully meet the requirements of such a tool.

The invention consists of certain parts and details and combinations of the same as will be hereinafter fully described, and then pointed out in the claims.

Reference is to be had to the accompanying drawings, forming a part of this specification, in which similar letters of reference indicate corresponding parts in all the figures.

On Sheet 1. Figure 1. is a side elevation of the device for shaping swaged saw teeth (hereinafter referred to as a shaper.) Fig. 2. is a top view of the same, with the operating handle broken away, to better show the other parts. Fig. 3. is an inverted plan view of the shaper with the operating handle removed. Fig. 4. is a front view of the shaper as viewed from the left in Fig. 1. but with the operating handle moved to a vertical position. Fig. 5 is a sectional view of the same on the line Y. Y. of Fig. 1. but with the centering guides removed and the operating handle broken away. Fig. 6. is a rear view of the shaper as viewed from the right in Fig. 1 with a portion of the forward part of the tool omitted. Fig. 7 is a sectional side elevation of the body A on the section line $x$—$x$ of Fig. 2. Figs. 8, 9, 10, 11, 12, 13, 14, 15, 16, 17, 18, 19, 20, 21, and 26 on Sheet 2, and Figs. 24 and 25 on Sheet 1 are detailed views of the device. Fig. 22 is a sectional view on the line $v$—$v$ of Fig. 1, and Fig. 23 is a sectional view of the carrier on the line $o$—$o$ of Fig. 2.

In the drawings, A represents the body or frame of the shaper having an opening A' vertically therethrough near one end. A bushing B is fitted within this opening and carries the hook B' and rest B''. These parts engage the saw tooth to be shaped, as shown in Fig. 13. Depending sides D' are provided on the body A near the opening A' and in these depending sides pressure screws E are mounted and the centering guides E' depend from the sides D', as will hereinafter be described in detail.

M is a rearwardly extending portion having flanges E'' adapted to extend downwardly on each side of the saw, (see Figs. 1 and 7) and protect the hands of the operator in manipulating the tool. An operating handle F' has a forked lower end fitting the pressure screws E whose ends are squared, as shown clearly in Fig. 1, and are provided with double right and left hand threads respectively, and are adapted to be operated simultaneously when the handle F' is moved.
By swinging the handle in one direction the screws will move toward one another to engage the pressure dies and recede from one another when the handle is moved in the other direction to release the dies and the saw tooth. Bushings F'' are fitted within sockets in the forked ends of the operating handle and have square holes to receive the squared ends of the pressure screws.

When the operating handle is moved a part of a revolution the screws will be turned and their square ends will slide in the bushings and adjust themselves therein to the movement of the screws. The ends of the fork on the operating handle are split, as indicated in Fig. 25, and bolts G pass therethrough and clamp the said ends firmly on the bushings F''. By loosening the screws the bushings may be rotated independently of one another and the pressure screws adjusted in any desired position with respect to the dies. The bushings F'' extend beyond the ends of the operating handle to provide for a sufficient bearing surface for the ends of the pressure screws and also to leave a socket into which some suitable instrument may be inserted for the purpose of adjusting either bushing and its pressure screw independently of the other bushing and its screw. The outer end of each bushing is rounded as shown in Fig. 4 to prevent any possibility of the clothing of the operator catching on the tool in moving back and forth beside the saw or from the shaper to the swage.

Fitting within the opening A' in the body A is a split bushing B (see Figs. 8, 9, 10 and 11.) One of these bushing sections is recessed, as indicated in Fig. 8 and Fig. 9, to receive a hook B' and a rest B'', shown in Figs. 12 and 13. The parts B' and B'' are placed together and inserted between the sections of the bushing and the bushing put into the opening A' (see Fig. 2) and secured by set screws G', as indicated in Fig. 14. The hook B' and the back rest B'' are formed separately to enable the operator to take them out and grind their lower ends to any desired shape to fit different saw teeth. The manner of their engagement with the teeth is indicated in Fig. 13.

H represents the shaping dies secured on hinges H' that are adjustably pivoted on sliding carriers H''. These carriers are adjustably mounted on the rearwardly extending portion M by a bolt H''' (see Figs. 1 and 2). The carriers H'' are made adjustable endwise by means of screws I and a slot K in the carriers H'' for the bolt H'''. The hinges H' are mounted on the carriers H'' by means of bolts I' passing through slots J' in the carriers H'' (see Figs. 1, 2, 3, and 20). The bushing I'' (see Fig. 21) is made longer than the width of the loop I''' (see Figs. 17 and 18), and is fitted in said loop when the parts are placed in a box J of the carriers H'' (see Figs. 1, 20 and 23). The bolts I' are passed through the slot J' in the carriers and the bushings I'' and by tightening this bolt the bushings are held securely in any desired position in the slots J', but permit the hinges H' to swing freely back and forth and the dies H to be moved toward the saw tooth or withdrawn therefrom. The bolts I' are prevented from turning by their square heads J'' fitting into notches J''' in the upper side of the carriers (see Figs. 1, 2 and 23).

In Fig. 23 I have shown one of the bolts I' in position to hold its bushing firmly by springing the walls of the pocket sufficiently to grip the ends of the bushing. The walls of the pocket are capable of such movement being connected to the carriers only on one side by the wall K'. Fig. 23 also illustrates the hole K'' in which the adjusting screws I threaded into the body A are fitted. The centering guides E' heretofore referred to are secured to the depending sides D' of the body A by screws K''' passing through the slots L in the said guides (see Fig. 15).

The screws K''' are threaded into the said depending sides and the guides E' are prevented from turning when the screws are adjusted, by ribs L' which fit into corresponding grooves L'' on the said guides (see Figs. 1, 15 and 26). The shaping dies H move laterally between the under side of the body A and the upper portion of the guides E' (see Fig. 4).

In operation the shaper is placed on the saw as illustrated in Fig. 1. The saw teeth D pass between the flanges E'' (see Figs. 1, 4 and 6). The handle F' is turned toward the left from the position shown in Fig. 1 about one-third of a revolution, whereupon the pressure screws will be turned and as they recede from the shaping dies the latter will separate and permit the saw tooth to pass between them (see Fig. 5). The tool is then moved toward the right (see Fig. 1) until the tooth to be shaped engages the hook B' and the back rest B'', as indicated in Fig. 13, the hook and rest being located between the shaping dies H and also between the pressure screws E, as shown in Fig. 26. When the shaper has been adjusted in this position with the tooth to be shaped between the shaping dies, which dies having tapering forward ends L''' as indicated in Fig. 16, the operator grasps the handle F' and throws it back toward the right or to the position shown in Fig. 1. The pressure screws E are thereby rotated to press the dies H against the sides of the saw tooth and give the desired bevel to the tooth point. The handle F' is then swung to the left again causing the pressure screws to recede from the dies H and the tool is pushed along the saw until the hook B' passes over the point of the next tooth to be shaped and the tool bears on the back rest B'', when the operation above described is repeated. The centering guides E' cause the tool at all times to ride centrally on the saw and the hook B' and the back rest B'' to drop on to each saw tooth directly in the center of the swaged point, as indicated in Fig. 4, leaving the surplus width of the swaged point to the tooth projecting an equal distance on each side of the hook B' and insuring an equal action by the dies H on both sides of the said swaged point, and thus maintaining a balanced point on the saw tooth. The guides E' being adjustably secured to the depending portions of the body A, may be set at different distances apart to adapt them for saws of different thickness. The forked handle F' insures uniform, simultaneous action on both pressure screws, and the operating handle being in the plane of the saw prevents any undue side strain on the saw that would tend to bend the teeth laterally. The handle F is also located directly above the saw for the same reason. The split bushing B holds the hook B' and the back rest B'' rigidly in the body A and prevents them from springing away from the saw tooth. This is essential in a tool of this kind as the uniformity in the width of the saw teeth points after being shaped depends very largely on the hook B' and rest B'' being held securely in the same relative position between the bevels L''' of the dies H. Furthermore the bushing B permits the use of inexpensive hooks and back rests which are often broken and require frequent renewal. The bearing formed in the carriers H'' at each end of the bolts I' prevents the hinge from being twisted laterally when the die H is pressed against the swaged part of the saw tooth.

I claim as my invention:—

1. A device for shaping swaged saw teeth, comprising a body A having an opening A', a tooth-engaging hook B' and a back rest B'', between which hook and rest the tooth point to be shaped is inserted, substantially as described.

2. A device for shaping swaged saw teeth, comprising a body A having an opening A', a bushing B fitting within said opening and composed of separable sections having a securing screw G and a tooth-engaging hook B' carried by said bushing.

3. A device for shaping swaged saw teeth, comprising a body A having depending sides D' and centering guides E' secured to said depending sides, said centering guides being of less width than the distance between two adjoining saw tooth points, whereby the tool can be placed on the saw or removed without adjustment of the guides.

4. A device for shaping swaged saw teeth, comprising a body A having a rearwardly extending portion M provided with longitudinal slots, carriers H'' slidably arranged on each side of said rearwardly extending portion, a clamp bolt connecting said carriers through said slots across said rearwardly extending portion and permitting the adjustment of said carriers independently of one another, and means adjustably connecting each of said carriers with said body and pressure dies mounted in said carriers.

5. A device for shaping swaged saw teeth, comprising a body A having a rearwardly extending portion M, carriers provided on each side of said rearwardly extending portion and having slots K, a bolt H''' connecting said carriers with one another through said slots, and bolts I arranged substantially at right angles to said bolt H''' and adjustably connecting said carriers with said body.

6. A device for shaping swaged saw teeth, comprising a body A having a rearwardly extending portion M, carriers H'' provided on each side of said rearwardly extending portion, bolts I' mounted in said carriers, bushings I'' carried by said bolts and locked thereon, hinges H' loosely mounted on said bushings and free to swing thereon, and pressure dies carried by said hinges, substantially as described.

7. A device for shaping swaged saw teeth, comprising a body A having a rearwardly extending portion, carriers H'' provided on each side of said rearwardly extending portion and having transverse slots J' open at one end, bolts I' fitting within said slots, bushings I'' mounted on said bolts and adapted to be clamped when the bolts are tightened, hinges H' loosely mounted on said bushings and adapted to swing toward or from each other thereon, substantially as described.

8. In a device for shaping swaged saw teeth, sliding carriers H'' having transverse notches J''' formed therein, bolts I' passing transversely through said carriers and having heads fitting said notches, whereby said bolts will be prevented from turning, said bolts being substantially vertical, hinges loosely mounted on said bolts and adapted to swing laterally thereon, and pressure dies mounted on said hinges.

9. A device for shaping swaged saw teeth, comprising a body A, die operating screws E mounted therein and having outer ends polygonal in cross section, bushings F'' fitting said ends and slidable lengthwise thereon, whereby said bushings will adjust themselves automatically to the positions of the screws, and a forked operating handle adjustably mounted on said bushings.

10. A device for shaping swaged saw teeth, comprising a body A, die operating screws E mounted therein, said screws having outer ends polygonal in cross section, bushings fitting on the outer ends of said screws and adapted to revolve therewith and a forked operating handle having a clamping means for securing it on said bushings.

11. A device for shaping swaged saw teeth, comprising a body A, pressure dies H, pressure screws E provided upon each side of said dies and adapted to force them toward one another, a handle F having a hand hold part and a forked lower end adapted to straddle said body A, and bushings mounted in said forked lower end and having bearings on the outer ends of said pressure screws and each of said bushings being capable of rotary adjustment with its screw independently of said operating handle, whereby the position of each screw may be changed without affecting the other screw.

EDWARD PICKERING ARMSTRONG.

Witnesses:
G. L. WEBB,
S. E. WEBB.